June 14, 1932. W. JENSEN 1,863,341
REEL FOR DETACHABLE CONDUITS
Filed May 31, 1930
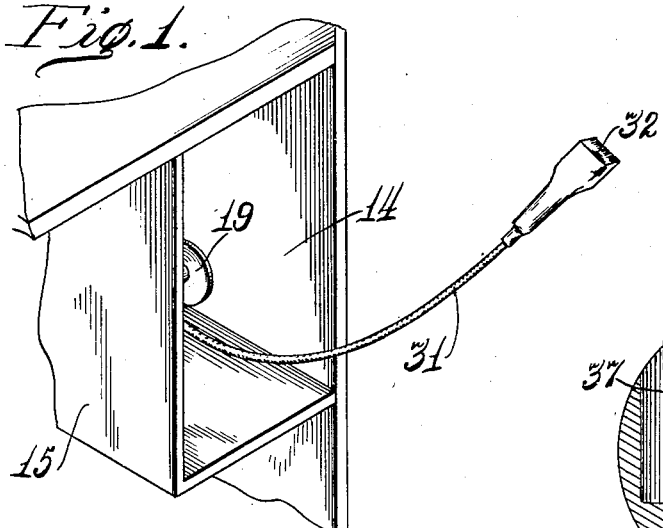
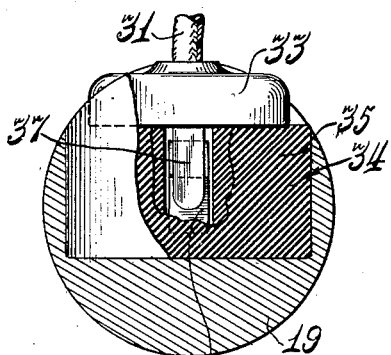
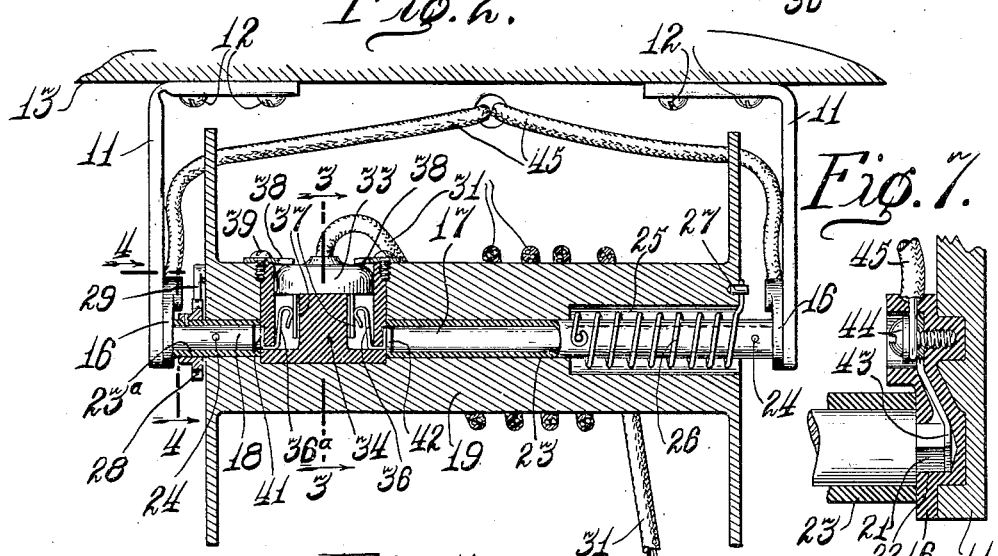
Inventor.
William Jensen.
Daniel Brennan
Attorney.

Patented June 14, 1932

1,863,341

UNITED STATES PATENT OFFICE

WILLIAM JENSEN, OF CHICAGO, ILLINOIS

REEL FOR DETACHABLE CONDUITS

Application filed May 31, 1930. Serial No. 457,891.

The invention relates to reels and particularly to an improved spring controlled electrical cord reel having detachable means therein for connecting said cord with an electrical supply source.

An object of the invention is to provide a reel of the character referred to, and a mounting, adapted to receive in electrical connection therewith an extension cord of a portable electrically operated instrument.

Another object of the invention is to provide a demountable revolvable reel with separable means for connecting an electric conductor with the source of supply.

Another object of the invention is to provide a demountable automatic winding reel, of the character referred to, with a socket for detachably connecting an extension cord thereto.

Another object of the invention is to provide an improved reel, including a separable connection for an extension cord adapted to be wound thereon, with novel yieldable mounting means.

Another object of the invention is to provide an improved reel with detachable means for securing an extension cord thereto, against accidental disengagement.

The foregoing and such other objects of the invention as will appear hereinafter as the description proceeds will be more readily understood from a perusal of the following specification, reference being had to the accompanying drawing, in which:

Fig. 1 is a perspective view of a portion of a cabinet showing the improved reel mounted therein.

Fig. 2 is a longitudinal central sectional view taken through the improved reel and mounting, shown partly in elevation.

Fig. 3 is a transverse sectional view, taken on line 3—3 of Fig. 2, shown partly in elevation.

Fig. 4 is an enlarged fragmentary end view of the improved reel, taken substantially on line 4—4 of Fig. 2.

Fig. 5 is an enlarged detailed sectional view showing the yieldable contact between one of the shafts and an electric terminal.
Fig. 6 is a fragmentary elevational view of one of the mounting brackets, viewed from the inside.

Fig. 7 is a horizontal sectional view through the end of one of the mounting brackets shown with a shaft in place.

Variously electrically operated portable instruments such as, for example, barbers' automatic hair clippers, are provided with a nonseparable flexible extension cord or conductor adapted to connect detachably with a suitable source of supply. The conductor or cord in such instances, is necessarily long, to provide freedom of movement, and is usually wound up on the instrument, when not in use. The employment of automatically winding reels for extension cords on such devices has heretobefore been impractical, because the cord cannot be detached from the clipper. Reels of known construction necessitate permanent connections, being made between the cord and the reel, thus ready detachment of the cord is impossible. To remedy the foregoing objections, it is desirable to provide separable connecting means between the reel and the cord.

The device illustrated preferably includes a pair of spaced L-shaped brackets 11, fixedly secured in place by screws 12. These brackets may be secured to any suitable support 13, but preferably on the back wall of a compartment 14, such as is commonly provided in a fixture 15. Each bracket 11 preferably is provided with a bearing member 16 of suitable insulating material, for receiving shafts 17 and 18 which are mounted in and extend beyond the respective ends of a reel 19. The bearing end of each shaft 17 and 18 preferably is formed square, as at 21, for engaging in the squared recesses 22—22 in bearings 16 whereby rotation of the shafts is prevented.

The shafts 17 and 18 are each insulated from the reel 19 by suitable insulating sleeves 23 and 23a respectively, each of which is secured to its respective shaft by a pin 24. The reel 19 is freely mounted on the shafts 17 and 18 and it is formed of any suitable material. An enlarged axial bore 25 is provided at one end of the reel for receiving a coil spring 26. The innermost end of said spring is anchored to sleeve 23 and its other end is secured, by a pin 27, to the reel, whereby said reel always is returned to normal position.

A ratchet 28 is fixedly secured to the insulating sleeve 23a adjacent one end of the reel 19, which co-operates with a pawl 29 pivotally mounted to the end of said reel. This pawl and ratchet arrangement holds the reel in any adjusted position against the action of spring 26.

As previously referred to, an extension cord 31, fixedly connected at one end to clippers, or other similar electrically operated portable mechanism 32, is adapted to be detachably secured to the reel. This cord attaching means preferably comprises the usual plug 33 for insertion into a socket 34 provided in the body portion of reel 19. The socket illustrated in the drawing preferably includes a body portion 35 suitable of insulating material and terminals 36—36a for yieldingly engaging contacts 37 on plug 33 upon insertion of the latter therein. Accidental disengagement of plug 33 from socket 34 is prevented by retaining fingers 38, which engage the plug 33 and are pivotally mounted on the reel body by screws 39. The terminals 36—36a are each electrically connected with the respective shafts 17 or 18, said terminals having outwardly extending lip portions 41 turned downwardly to bear against a spring pressed plunger 42 carried in the recessed end of each shaft.

With shafts 17 and 18 inserted into the respective recess 22—22, in bearing members 16, the squared end 21 of each trunnion bears against a leaf spring contact member 43, one of which is mounted in each recess 22—22. Each contact member 43 is connected at one end by a screw 44, to a supply line wire 45 having connection with the source of electrical supply. The insulating material forming bearings 16 completely embeds the leaf spring contact members 43, and the screws 44 are preferably embedded in a suitable insulating compound, (not shown). It can readily be understood that the structure described in the foregoing provides practical means for detachably connecting a cord to a reel whereby the cord is easily and quickly attached to or detached therefrom. Ready removal of the reel 19 from the brackets 11 is preferably attained by providing one yieldable bracket 11 and, (with reference to Fig. 2) upon urging the reel towards the left the shaft 17 is withdrawn from its bearing.

Electrical current is delivered to the hair clipper or other electrical mechanism 32, from the supply source through supply lines 45, spring contacts 43, shafts 17 and 18, and through terminals 36—36a to contacts 37 on plug 33. The brackets and reel are thoroughly insulated from the supply, and the user is not subjected to electric shocks. If desired, a suitable cut-off switch (not shown) may be inserted in either of the supply lines 45.

Although the improved structure is shown as being particularly applicable to barbers' clippers, this structure may satisfactorily be employed in connection with any portable electrical apparatus, and although an exemplary form of the device is illustrated, and described in detail in the foregoing specification, it is to be understood that the structure is capable of embodying variations and modifications in structural detail without departing from the spirit of the invention or the scope of the appended claims.

I claim:

1. A spring wound reel having an extension cord wound thereon; a socket in said reel having electric terminals connected to a supply source; and a plug on said cord adapted to engage in said socket whereby the cord is connected to the supply source.

2. A spring wound reel having an extension cord wound thereon; a socket in said reel having electrical terminals connected to a supply source; a plug on said cord adapted to engage in said socket whereby the cord is connected to the supply source; and means on said reel for removably securing the plug in said socket.

3. A reel having, in combination, a pair of brackets; said reel being mounted on shafts carried in said brackets, said shafts being insulated from said reel and said brackets, and having a yieldable electrical connection with an electric supply source; a socket in said reel having a pair of yieldable terminals each contacting one of said shafts; an extension cord adapted to be wound on said reel having a plug on its end for engagement in said socket; and means in said reel for automatically winding said cord thereon.

In testimony whereof I affix my signature at 10 South LaSalle Street, Chicago, Illinois.

WILLIAM JENSEN.